A. E. McCOLL.
COMBINED DIFFERENTIAL AND REVERSE POWER RELAY FOR THE PROTECTION OF GENERATORS AND TRANSFORMERS.
APPLICATION FILED DEC. 30, 1919.

1,354,573.

Patented Oct. 5, 1920.

UNITED STATES PATENT OFFICE.

ALBERT EDWARD McCOLL, OF DUMBARTON, SCOTLAND, ASSIGNOR OF ONE-HALF TO THE GENERAL ELECTRIC COMPANY, LIMITED, OF BIRMINGHAM, ENGLAND.

COMBINED DIFFERENTIAL AND REVERSE POWER RELAY FOR THE PROTECTION OF GENERATORS AND TRANSFORMERS.

1,354,573.     Specification of Letters Patent.     Patented Oct. 5, 1920.

Application filed December 30, 1919. Serial No. 348,381.

*To all whom it may concern:*

Be it known that I, ALBERT EDWARD Mc-COLL, a subject of the United Kingdom of Great Britain and Ireland, and resident of 1 Levengrove Terrace, Dumbarton, in the county of Dumbarton, Scotland, have invented certain new and useful Improvements in Combined Differential and Reverse Power Relays for the Protection of Generators and Transformers, of which the following is a specification, such as will enable others skilled in the art to which it appertains to make and use the same.

This invention relates to means for protecting alternating current generators and transformers and has for its object to combine in one relay protective means capable of dealing with leakages to ground or between phases and also with the reverse current which flows into a generator on loss of field or into either a generator or a transformer on breakdown between turns of the same phase.

To this end therefore, I connect one element of a reverse power relay in shunt across an unbalanced circulating current system, another element being energized from the potential of the circuit, the direction of flow of the unbalanced portion relatively to the potential of the circuit actuating said other element being such that the relay is held definitely in the inoperative position, the unbalanced portion providing the means whereby the device is actuated with a reversal of current flow in the circulating current system; whereas, if leakage to ground or between phases develop, the relay becomes immediately operative when the value of the leakage current becomes sufficient to restore the balance of the circulating current system and to reverse the direction of current flow in the element connected in shunt.

Figure 1:
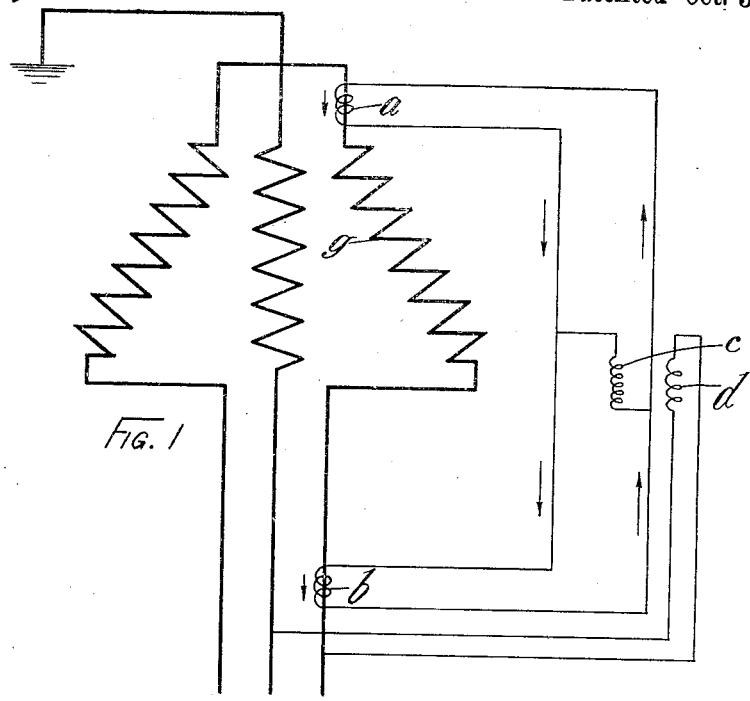
Figure 1 shows the invention applied to a three-phase star connected generator, the arrangement being shown on one phase only to simplify the diagram.

Referring to Fig. 1, $a$ and $b$ represent series transformers connected in the star-point and bus-bar ends of the generator winding $g$; the transformers, it will be observed, being connected for circulating current. $c$ represents one element of a reverse power relay connected in shunt across the circulating current system, and $d$ another element energized from the potential of the generator. The secondary of the series transformer $b$ is designed to circulate, say 10% more current into the system than the transformer $a$.

For example, the transformer $a$ may be wound for 10 amperes secondary and the transformer $b$ for 11 amperes.

The unbalanced current of one ampere will normally circulate through the element $c$ of the relay as shown by the arrows.

The direction of this current relatively to the potential of the circuit energizing the element $d$ is such that the relay is held strongly in the non-operative position.

If, now, there be a reversed flow into the generator winding such as may occur with a break-down between turns of the same phase or with loss of excitation, the relative proportions of the current flowing in the transformers at each end of the generator winding is not altered. In this case there will be a reverse flow from the busbars into the generator. The whole current in the circulating current system therefore will be reversed; the one ampere of unbalanced current which previously held the relay strongly in the inoperative position will also be reversed and will cause the relay to swing over to the operating side and to actuate the controlling switch of the generator.

If a leakage to ground or between phases develop, the fault current will flow only in the transformer $a$.

Should the fault current have a 10% value while the delivery of power is still in the forward direction, the transformer $a$ will deliver 11 amperes to the circulating current system, thereby balancing the circuit so that no current now flows through the element $c$. Further increase of fault current beyond the 10% value will cause the transformer $a$ to deliver a larger current to the circulating current system than the transformer $b$, the unbalanced current flowing through the element $c$ in the direction reverse to the previous direction, thereby permitting the relay to operate.

Figure 2:
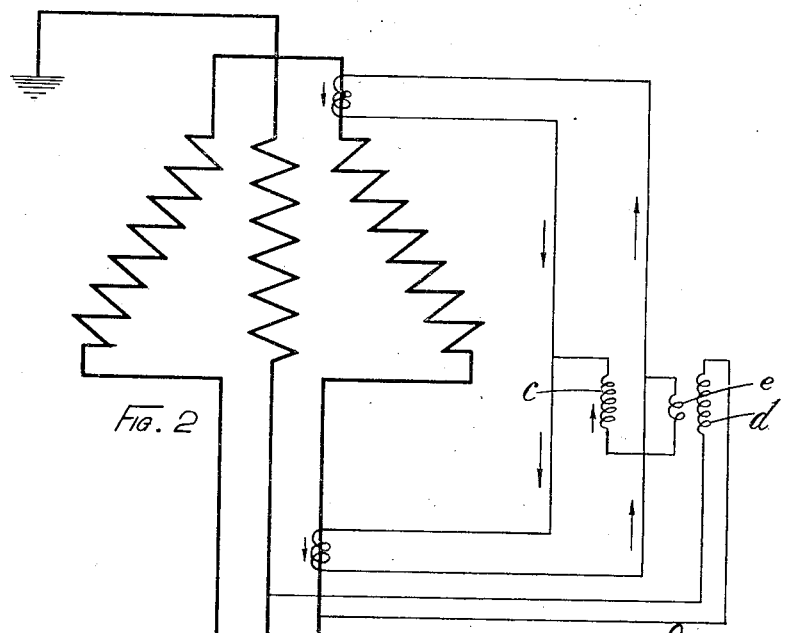
Fig. 2 shows a modification of the arrangement illustrated in Fig. 1 whereby the relay may operate even with complete collapse of the generator voltage.

Fig. 2 shows a further development of the invention wherein the relay may operate on a fault even with complete collapse of the generator voltage. The appropriate means to obtain this result comprise an auxiliary winding $e$ connected in series with the element $c$. It may also, however, be connected in parallel. This auxiliary winding $e$ may consist of a few turns wound on the same limb as the potential coil and under normal conditions opposes the field set up by the element $d$. The ampere turns of the auxiliary winding $e$ may comprise, say, one per cent. of the ampere turns of the element $d$. If the potential coil be disconnected the relative connection of the auxiliary winding $e$ and the element $c$ is such that the relay always tends to operate. Normally, however, operation of the relay is prevented by the preponderating field set up by the potential element $d$.

If, now, we consider the effect of the auxiliary winding $e$ on the relay under fault conditions, say, a leak to earth, it will be observed that as the current flows through the element $c$ and the auxiliary winding $e$ in the reverse direction the auxiliary winding $e$ now aids the potential element $d$. If the potential element $d$ is weakened due to severe fault conditions which cause collapse of the bus-bar voltage it will be evident that the auxiliary winding $e$ maintains a weak field which permits the relay to operate.

The auxiliary winding $e$ is simply intended as a safety means to insure operation of the relay under extreme conditions which might otherwise lead to failure of the protective device to discriminate correctly. The small proportion which the ampere turns of the auxiliary winding $e$ bear to those comprising the potential element $d$ is insufficient to affect the correct operation of the relay in normal circumstances.

What I claim and desire to secure by Letters Patent is:—

1. In an alternating current electric protective system for generators and transformers, controlling means comprising a generator winding, series transformers connected in star point and bus bar ends of said winding and the secondaries of said transformers connected together for circulating current one element of a reverse power relay connected in shunt across the said circulating current system, and another element of the reverse power relay energized from the potential of the generator.

2. In an alternating current electric protective system for generators and transformers, controlling means comprising a generator winding, series transformers connected in star point and bus bar ends of said winding and the secondaries of said transformers connected together for circulating current, the second named of said series transformers being wound to give a larger secondary current than the other, one element of a reverse power relay connected in shunt across the circulating current system, and another element of the reverse power relay energized from the potential of the generator.

3. In an alternating current electric protective system for generators and transformers, controlling means comprising a generator winding, series transformers connected in star point and bus bar ends of said winding and the secondaries of said transformers connected together for circulating current, one element of a reverse power relay connected in shunt across the said circulating current system, another element of the reverse power relay energized from the potential of the generator, and an auxiliary winding also connected in shunt across the circulating current system and arranged to normally oppose the field set up by the element energized from the potential of the generator.

In witness whereof I have hereunto set my hand in presence of two witnesses.

ALBERT EDWARD McCOLL.

Witnesses:
 ISABEL ROLLO,
 KATE FOTHERINGHAM.